United States Patent Office 2,878,242
Patented Mar. 17, 1959

2,878,242

ISOPROPYL AMINE PROCESS FOR ROSIN ACIDS

Nicholas J. Capron, Neshaminy, Pa., assignor to Pennsalt Chemicals Corporation, a corporation of Pennsylvania No Drawing. Application April 23, 1956
Serial No. 579,725

7 Claims. (Cl. 260—97.6)

This invention relates to processes for purifying and separating rosin acid from tall oil and other impure rosins by the use of isopropyl amine. The invention is also directed to the preparation of a pure limed rosin.

As is well known, crude tall oil normally contains around from 40 to 50% rosin acids, 40 to 50% fatty acids and 7 to 15% unsaponifiables. Typical of the rosin acids are abietic, neoabietic and pimaric acids. The unsaturated fatty acids present consist primarily of oleic acid and linoleic acid. Tall oil crude can be used per se in some industries but in most cases a refining process is necessary to remove pitch and other foreign materials.

Single distilled tall oil is a yellow semi-solid mass which might contain, for example, about 45% rosin acids, 45% fatty acids and 10% unsaponifiables. A further series of distillations can effectively separate the fatty acids from the rosin acids. This is the main commercial method of separating the tall oil components, and a good grade of fatty acids is obtainable, but the rosin acid fraction becomes discolored and suffers some decarboxylation. A refinement of this process consists of a prior esterification of the fatty acids followed by distillations at somewhat lower temperatures in order to minimize rosin acid degradation.

Various chemical methods have been developed to separate the rosin acids from the fatty acids without the degradation of the rosin acids brought about by the distillation procedures. Kalman, in U. S. Patent No. 2,532,101, discloses a process for the separation of rosin acid comprising the precipitation of the rosin acids by the neutralization thereof by the use of cyclohexylamine. The cyclohexylamine salts of rosin acids are separated from the hydrocarbon solvent which contains the various other impurities in the starting material and thereafter the rosin acid is regenerated by acidulation.

Babayan, U. S. Patent No. 2,578,661, in a similar process with cyclohexylamine precipitates cyclohexylamine salts of rosin acids in a two phase liquid system—a solvent solution containing fatty acids and unsaponifiables and an aqueous solution of cyclohexylamine containing a neutral salt. The introduction of water into the tall oil complicates subsequent recovery of the amine in a pure form since its high boiling point precludes recovery by distillation. Recovery processes employing ether extraction techniques are costly as well as dangerous.

While these processes of Kalman and Babayan separate the rosin acid from the crude starting materials, they leave a great deal to be desired in the quality of the recovered rosin acid. In these prior art processes the recovered rosin has a softening point considerably lower than pure rosin acids. It is generally contaminated with considerable amounts of impurities including fatty acids and is usually of a much darker color than is desired.

I have now discovered a process for purifying and recovering rosin acids from materials containing rosin acid in a crude form which comprises adding isopropyl amine to the crude material dissolved in a solvent in quantities sufficient to neutralize the acid materials present. The solid isopropyl amine salt of the rosin acid, generally called isopropyl ammonium resinate, is separated from the solvent layer and thereafter the rosin acid is liberated from the isopropyl ammonium resinate and recovered in a pure form. An alternative process is provided to produce a purified grade of limed rosin by treating the isopropyl ammonium resinate with a lime slurry which forms calcium resinate and liberates the isopropyl amine.

The following description of the preferred embodiment of my invention is related in reference to treating tall oil to recover and purify its rosin acid content. It is to be understood, however, that the process is equally applicable to other materials containing rosin acid such as gum rosin, wood rosin, tall oil rosin, disproportioned rosin, hydrogenated rosin, crude tall oil, distilled tall oil and refined tall oil. The process is also applicable to crude rosin acids containing non-acidic impurities.

More specifically, tall oil rosin is dissolved in a suitable solvent such as commercial hexane. The proportion of solvent is not critical, being used mainly to facilitate subsequent precipitation and filtration operations. I have found that roughly two volumes of solvent per volume of tall oil is satisfactory. Anhydrous isopropyl amine is introduced with agitation in an amount approximately stoichiometrically equivalent to the total acidity of the crude rosin material. Somewhat more or somewhat less amine than this may be used, but too great a departure in either direction tends to reduce the yield of the rosin acids.

Although we prefer to add the solvent before the amine, the reversed addition is entirely feasible; for example, a solution of the amine in the solvent may be added to the crude rosin acid, and this may be the preferred type of operation for certain starting materials.

The amine-solvent-crude rosin mixture is agitated until precipitation of the isopropyl ammonium resinate has approached its maximum, whereupon the latter is separated from the liquid phase by filtration or centrifugation. The temperatures of the slurry are not critical, and operation at room temperature or lower is satisfactory. The separated cake is washed with additional solvent.

The washed isopropyl ammonium resinate is a white, crystalline solid which may be treated in any of various ways to recover isopropyl amine and pure rosin acid. For example, the resinate may be reslurried in hexane and this solution acidified with an equivalence of mineral acid such as sulfuric acid to form an oil layer of rosin acid dissolved in hexane and a water layer of isopropyl ammonium sulfate. The hexane may be stripped completely from the oil layer by distillation. The resulting dry rosin acid is a hard, pale, yellow material unusually mild in odor, and practically free of fatty acids and unsaponifiables. The product is clear when formed and remains clear on aging.

The filtrate remaining from the separation of the isopropyl ammonium resinate contains the isopropyl ammonium salts of any fatty acids originally present in the crude rosin starting material as well as the so-called unsaponifiables. This filtrate is treated in the same manner as the slurry of isopropyl ammonium resinate; that is, it is first acidified by the addition of a mineral acid such as sulfuric acid whereupon two liquid layers are formed, which are separated. The aqueous layer containing the isopropyl ammonium sulfate is treated with caustic to regenerate the isopropyl amine which is recovered by fractional distillation in practically anhydrous form. The solvent layer containing the free fatty acids is distilled to remove the solvent from the fatty acid.

The sodium sulfate formed by the neutralization of the isopropyl ammonium sulfate with sodium hydroxide can be advantageously used in manufacturing tall oil by the sulfite pulp wood process. Thus, the sodium sulfate can be reacted with carbon or carbon monoxide to produce sodium sulfide, a raw material used in the pulp process which gives tall oil as a by-product.

The solvents which are useful in practicing my invention must have a low solubility for isopropyl ammonium resinate, relatively low viscosity and a rather high volatility and in the case of tall oil moderate solubility for fatty acids and isopropyl ammonium salts of the fatty acids. In regard to the volatility the solvent should boil below about 200° C. and preferably below about 100° C. Aliphatic hydrocarbon solvents such as butane, propane, hexane, heptane and octane are satisfactory. Also satisfactory are materials such as cyclopentane, cyclohexane, ketones such as methylethyl ketone and methylisobutyl ketone. Where solvents with low boiling points are used, operation in a closed system under pressure will be desirable.

The amount of isopropyl amine added to the crude rosin acid containing material is preferably about equivalent to the total acidity present. The amine requirement can readily be computed from the acid number of the crude rosin acid mixture. Alternatively, the amine may be added gradually or in increments until the pH of the reaction mass reaches a value between about 5 and 9. In some instances, it may be satisfactory to add only enough amine to form the salt of the rosin acids present. A large excess of amine is undesirable although a moderate excess such as 10% or so would be operable.

Substantially anhydrous conditions should be maintained during precipitation of the amine resinate since water tends to cause emulsification and jelling and makes the resulting separation more difficult. Small amounts, say up to 2% or in some cases even somewhat more such as up to 5% can be tolerated but are preferably not present.

The temperature of the slurry during precipitation and filtration is not critical. Preferably, the temperature is maintained around 0° C. although temperatures up to 50° C. may be used. Temperatures below 0° C. are also operable. As the temperature is raised from 0° C., the yields of amine resinate progressively fall due to increase in solubility in the liquid phase but not to an important extent up to 40° C. or 50° C.

The isopropyl ammonium resinate which is separated from the hydrocarbon salts containing fatty acids may be treated in any of various ways to recover isopropyl amine and rosin acid. Preferably, the resinate may be slurried or dissolved in a solvent and acidified with an equivalence of mineral acid such as sulfuric acid to form an oil layer of rosin acid dissolved in solvent and a water layer of isopropyl ammonium sulfate or chloride. The solvent may then be stripped completely from the rosin acid which leaves the product as a clear, hard, pale, yellow material practically free of fatty acids and unsaponifiables. A particular feature relating to the use of isopropyl amines in my process is that the isopropyl amine resinate salt has a high filtration rate as compared to the amine resinates of the prior art.

It is also a feature of my invention as applied to tall oil that, in addition to pure rosin acids, there is obtained a second product fraction which is relatively rich in fatty acids, and more suitable for many purposes than the original tall oil. It is also a feature of my process that the solvents can be recycled without significant losses which provide for improved process economies. It is also a unique feature of my invention that the isopropyl amine is easily recovered in such a manner that it is essentially anhydrous and can be reused in the process without further treatment.

The rosin acids made according to my invention as described above are particularly suitable because of their high purity for the following purposes; the manufacture of products of the ester gum type by reaction with glycerine, pentaerithritol or other polyhydric alcohols; the manufacture of hard coating resins of the maleic rosin type by reaction with maleic anhydride or related acids; the manufacture of adhesives such as those comprising a natural or synthetic latex in admixture with a rosin derivative; the manufacture of rosin modified phenolaldehyde resins; the manufacture of products of the limed rosin type by reaction with hydrated lime.

In general, the pure resin acids obtained by practice of my invention give resinous products which are higher in melting point and more stable toward deterioration during use than are the analogous resins derived from less pure forms of resin acids such as rosin.

Similarly, the purified fatty acids are useful in the following applications: manufacture of soaps and synthetic detergents; manufacture of semi-drying oils; manufacture of alkyd resins. As an alternative process where a purified limed rosin is desired, the isopropyl ammonium resinate is treated with a basic calcium compound in the presence of water. This process produces calcium resinate in pure form and liberates the isopropyl amine which can be recovered by distillation and reused in treating crude tall oil or other types of rosin-containing materials.

The calcium resinate made according to this process has the advantage of being free of the fatty acids which would normally be present when the rosin acids are not separated from the fatty acids and other impurities. The purified limed rosin has particular advantage in the preparation of high grade varnishes, wall sizing, and gloss oils.

The basic calcium compounds useful in forming the limed rosins from the isopropyl ammonium resinate are either calcium oxide or calcium hydroxide. Water must be present for the reaction to take place in good yields. It is immaterial whether the isopropyl ammonium resinate be slurried in water and a dry basic calcium compound be added to the stirred slurry or the ammonium resinate can be added to an aqueous slurry of the basic calcium compound. The reaction will take place at room temperature but it is preferred that a temperature near 100° C. be used. A distinct feature of this particular process is that the isopropyl amine is recovered in nearly anhydrous condition by maintaining the reaction at a reflux temperature and condensing the evolved isopropyl amine. The aqueous calcium resinate is removed from the reactor and dried by conventional processes.

The limed rosin prepared in this manner is a white, fluffy powder with a melting point near 190° C.

The following examples are illustrative of my invention with all reference to parts being by weight.

EXAMPLE 1

1000 parts of single distilled tall oil were dissolved in 1320 parts of hexane at room temperature in a glass reaction vessel. 201 parts of isopropyl amine, a sufficient quantity to completely neutralize the acids present were added slowly and a temperature increase to 45° C. was noted. At the completion of the amine addition the semi-solid mass was cooled to 0° C. and filtered by suction. After washing with 396 parts of hexane, 390 parts of isopropyl amine rosin acid salts were obtained. These salts were quite water insoluble, ethanol soluble, white solids of M. P. 125° C. and containing 16.5% amine by analysis. The filtrate was set aside for fatty acid recovery. Filtration time was 2 hours.

The rosin amine salts from above were reslurried in 660 parts of hexane and to the rapidly stirred slurry a solution of 60 parts of sulfuric acid in 400 parts of water was added. The contact of acid solution with the amine salt solution liberated the free rosin acid which collected in the hexane layer. The amine reacted with the sulfuric acid to form the water soluble amine salt. After separation of the two layers, the water layer was saved for amine recovery and the hexane layer was distilled. From this distillation 320 parts of a highly crystalline rosin acid were obtained having properties outlined on Table I. This rosin acid retained its hard crystalline nature even when finely ground and remained free from tackiness after long storage periods. It was very mild in odor.

The fatty acid amine salt filtrate from above was treated with 125 parts of sulfuric acid in 500 parts of water, addition of the acid solution being made to the rapidly stirred hexane solution of the amine salts. The hexane and water layer were separated. The water layer contained the sulfuric acid amine salt and was saved for amine recovery. The hexane layer was distilled and 670 parts of fatty acids containing 14% rosin acids were recovered. This fraction had viscosities as noted on Table I. The Herrlinger-Compeau method of analysis was used to determine the rosin acids in fatty acids.

The water layers from the acid decomposition of the amine salts in each fraction above were combined in a still pot equipped with a fractionating column packed with glass helicies. 158 parts of caustic were added to the pot and upon heating to 65° C., isopropyl amine was recovered in practically anhydrous form, B. P. 34–40° C. The amine recovery amounted to 98% as was noted by titration with standard hydrochloric acid.

EXAMPLE 2

Using the same quantities and same conditions as in Example 1, but filtering at 20° C. gave 355 parts of isopropyl amine salt of the rosin acids. After acid decomposition of the amine salt and distillation of the hexane solvent, 300 parts of highly crystalline rosin acids, with properties noted on Table I were obtained. Filtration time was 2 hours.

After acid decomposition of the filtrate and distillation of the hexane solvent, 685 parts of fatty acids containing 17% rosin acids were obtained. Viscosity readings are noted on Table I.

EXAMPLE 3

1000 parts of tall oil, single distilled, were treated in 1320 parts of hexane with 322 parts of cyclohexylamine. A temperature rise to 45° C. was noted. The insoluble cyclohexylamine salts, 449 parts, were recovered after washing with 396 parts of hexane and vacuum filtration at 0° C. Four hours were required for the filtration. The fatty acid amine salt filtrate was set aside for fatty acid recovery.

The rosin acid amine salts were reslurried in 660 parts of hexane and 60 parts of sulfuric acid in 400 parts of water were added to the rapidly stirred slurry. After separation of the two layers and distillation of the hexane layer, 327 parts of rosin acids were obtained. The water layer from the acid decomposition of the amine salt was set aside for amine recovery.

The rosin acid product was opaque, somewhat dark in color and very tacky. When stored in pulverized condition, it soon formed a sticky cake which could be broken up only with difficulty. Other properties are given in Table I. It will be noted that the product contains 6–7 percent of fatty acids which presumably accounts for the lower melting point and tackiness as compared with the relatively pure rosin acids of Examples 1 and 2.

The fatty acid amine salt filtrate from above was treated with 125 parts of sulfuric acid in 500 parts of water in a rapidly stirred solution. The liquid layers were separated, the water saved for amine recovery and the hexane layer distilled to give 666 parts of fatty acids containing 13% rosin by analysis. Viscosity of this fraction is listed on Table I.

The water layers from each amine salt decomposition described above were combined and 148 parts of caustic added. The liberated amine was recovered in 50% yield by decanting the organic layer formed. Ether extraction was used in attempting to recover the remaining amine since distillation recovery methods, applicable to isopropyl amine, were not possible with this amine due to its high boiling point of 137° C.

EXAMPLE 4

400 parts of water were placed in a reactor equipped with an agitator and a horizontal air condenser and to which 100 parts of isopropyl ammonium resinate were added. 11 parts of finely-divided calcium hydroxide were added to the rapidly stirred slurry. The agitated mixture was heated to reflux temperature and then liberated isopropyl amine was collected in nearly anhydrous condition from the condenser. The isopropyl amine was recovered in from 70–90% yield. After the amine recovery, the calcium resinate slurry was filtered and the calcium resinate was dried. Approximately 100 parts of a white, fluffy powder having a melting range of 180–190° C. were obtained. This represents a yield of calcium resinate of about 85%.

The procedures of Example 1 and 2 above are applicable, under the same conditions, to recovery of rosin acids from gum rosin, wood rosin and various other grades of tall oil.

The presence of fatty acids in tall oil rosins tends to limit the uses of this material; for example, in the production of high gloss light colored varnishes small amounts of fatty acids tend to cause yellowing of the film as it ages. Additionally, in the production of rosin modified phenolic resins and rosin modified alkyd resins a high purity rosin acid is desirable to produce a high melting, more stable product. In the production of metallic dryers a pure rosin is necessary because small amounts of fatty acids sometimes adversely affect aging properties of the final product.

Generally for economic reasons a high purity rosin is very desirable because on a mole for mole basis it is reacted with glycerol or pentaerythritol or other intermediate with no non-reactive material present and for better reproducibility a purified rosin is to be much desired.

*Table I*

AMINE SEPARATION OF ROSIN ACIDS AND FATTY ACIDS

| Amine | Temp. or Separation, °C. | Source of the Acids | Properties of Rosin Acids | | | | | Properties of Fatty Acids | | | | | | Filtration Time[4], hrs. |
|---|---|---|---|---|---|---|---|---|---|---|---|---|---|---|
| | | | Acid No. | Softening Pt.[1], °C. | Percent Fatty Acids | Percent Unsap. | Color[2] | Vis., 25 °C.[3] | Vis., 50° C. | Vis., 75° C. | Acid No. | Percent Unsap. | Percent Rosin Acid | |
| Isopropylamine | 0 | Tall Oil | 180 | 75 | 0.0–0.8 | 0.0–0.1 | M-N | 75 | 34 | 19 | 178 | 8.2 | 14 | 2 |
| Do | 20 | do | 180 | 74 | 0.0–0.8 | 0.0–0.1 | M-N | 130 | 35 | 23 | 177 | 8.1 | 17 | 2 |
| Cyclohexylamine | 0 | do | 179 | 65 | 6.0–7.0 | 0.0–0.1 | L | 177.5 | 75 | 26 | 180 | 8.1 | 13 | 4 |
| None | | Wood Rosin | 165 | 69 | 0 | 7.0 | N | | | | | | | |
| Isopropylamine | 0 | do | 180 | 79 | 0 | 0 | N | | | | | | | |
| Do | 20 | Crude Tall Oil Rosin | 181 | 75 | 0 | 0 | M | | | | | | | |
| None | | Distilled Tall Oil | 157 | 69 | 2.2 | 11.8 | M | | | | | | | |

[1] Ball Ring Method—water.
[2] Gardner Color Standards.
[3] Brookfield centipoises.
[4] Time required for filtration based on 1000 gm. run of tall oil.

I claim:

1. The process of purification and separation of rosin acids from tall oil comprising treating tall oil dissolved in a solvent selected from the group consisting of hexane, butane, propane, octane, cyclopentane, cyclohexane, methylethyl ketone and methyl isobutyl ketone with isopropyl amine thereby precipitating isopropyl ammonium resinate, separating the isopropyl ammonium resinate from the said solvent solution, adding one of the said solvents to the isopropyl ammonium resinate and acidifying the mixture with acid to precipitate purified rosin acid in admixture with the said solvent as one phase and an aqueous acid phase containing isopropyl amine salt of the said acid, separating the purified rosin acid-solvent phase from the said aqueous acid phase, and thereafter separating the solvent from the purified rosin acid.

2. The process of claim 1 wherein the isopropyl amine contains no more than 5% water and the solvent is hexane.

3. The process of claim 2 in which the isopropyl amine is added in an amount equivalent to the total acidity present.

4. The process of claim 2 in which the purified rosin acid is recovered from the separated isopropyl ammonium resinate by adding mineral acid to the said isopropyl ammonium resinate while slurried in hexane, whereby a solution of purified rosin acid dissolved in hexane is formed together with an aqueous mineral acid solution.

5. The process of claim 4 in which the purified rosin acid is recovered from hexane solution by distilling off the solvent.

6. The process of claim 4 in which anhydrous isopropyl amine is recovered from the aqueous acid phase by causticizing the said acid phase with a metal hydroxide, and thereafter distilling and collecting anhydrous isopropyl amine as the distillate.

7. The process of preparing a purified lime rosin comprising reacting isopropyl ammonium resinate with calcium hydroxide in the presence of water to produce isopropyl amine, separating isopropyl amine and thereafter drying the limed rosin.

References Cited in the file of this patent

UNITED STATES PATENTS

| | | |
|---|---|---|
| 2,050,263 | Borglin | Aug. 11, 1936 |
| 2,419,211 | Harris | Apr. 22, 1947 |
| 2,532,101 | Kalman | Nov. 28, 1950 |